US007761689B2

(12) United States Patent
Thomsen

(10) Patent No.: US 7,761,689 B2
(45) Date of Patent: Jul. 20, 2010

(54) PROGRAMMING A DIGITAL PROCESSOR WITH A SINGLE CONNECTION

(75) Inventor: Joseph Alan Thomsen, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 12/269,988

(22) Filed: Nov. 13, 2008

(65) Prior Publication Data

US 2009/0070548 A1    Mar. 12, 2009

Related U.S. Application Data

(63) Continuation of application No. 11/227,884, filed on Sep. 15, 2005, now Pat. No. 7,487,331.

(51) Int. Cl.
G06F 3/00      (2006.01)
G06F 9/312     (2006.01)

(52) U.S. Cl. ..................................... 712/200
(58) Field of Classification Search ........................ None
See application file for complete search history.

(56) References Cited

U.S. PATENT DOCUMENTS

| 5,050,194 | A | | 9/1991 | Pickering et al. ............. 375/108 |
| 5,255,244 | A | | 10/1993 | Dey ............................ 365/233 |
| 5,307,348 | A | | 4/1994 | Buchholz et al. ............ 370/85.2 |
| 5,436,902 | A | * | 7/1995 | McNamara et al. .......... 370/447 |
| 5,471,462 | A | * | 11/1995 | Amador ....................... 370/252 |
| 5,706,115 | A | | 1/1998 | Hirayama et al. ............ 359/172 |
| 5,864,486 | A | | 1/1999 | Deming et al. ............... 364/489 |
| 5,872,994 | A | * | 2/1999 | Akiyama et al. .............. 712/43 |
| 6,055,578 | A | * | 4/2000 | Williams et al. ............. 709/253 |
| 6,424,591 | B1 | * | 7/2002 | Yu et al. ...................... 365/230.09 |
| 6,581,113 | B1 | * | 6/2003 | Dwork et al. .................. 710/52 |
| 6,662,314 | B1 | | 12/2003 | Iwata et al. .................... 714/42 |
| 6,735,657 | B1 | | 5/2004 | Falk et al. ..................... 710/305 |
| 2003/0188202 | A1 | | 10/2003 | D'Angelo et al. ............ 713/300 |
| 2004/0049619 | A1 | | 3/2004 | Lin ............................. 710/105 |

OTHER PUBLICATIONS

International Search Report for PCT/US2006/035709 mailed Feb. 22, 2007.
Sanders, L.S., Pulse Codes in Serial Data Communications, Definitions of Some of the More Commonly Used Encoding Schemes, Along with an In-Depth Analysis of NRZ and Manchester Codes; Computer Design, Pennwell Publ, Littleton, Massachusetts, U.S., vol. 21, No. 1, Jan. 1982, pp. 203-205, 208, 21, XP002054736, ISSN: 0010-4566, the whole document.

* cited by examiner

*Primary Examiner*—Eric Coleman
(74) *Attorney, Agent, or Firm*—King & Spalding L.L.P.

(57) ABSTRACT

A digital processor is coupled to a processor programmer through a single programming connection (e.g., terminal, pin, etc.) coupled to the single conductor programming bus. The processor programmer comprises an instruction encoder/decoder, a Manchester encoder, a Manchester decoder, a bus receiver and a bus transmitter. The digital processor comprises an instruction encoder/decoder, a Manchester encoder, a Manchester decoder, a bus receiver, a bus transmitter, a central processing unit (CPU), and a program memory. The instruction encoder/decoder is coupled to the CPU and the program memory. The bus receivers and bus transmitters are coupled to the single conductor programming bus which is coupled to a connection, e.g., terminal, pin, ball, etc., on an integrated circuit package containing the digital processor. The instruction encoder/decoder is coupled to a programming console, e.g., a personal computer, workstation, etc.

5 Claims, 1 Drawing Sheet

PROGRAMMING A DIGITAL PROCESSOR WITH A SINGLE CONNECTION

RELATED PATENT APPLICATIONS

This application is a continuation of and claims priority to commonly owned U.S. patent application Ser. No. 11/227,884, filed Sep. 15, 2005; now U.S. Pat. No. 7,487,331; issued Feb. 3, 2009; entitled "Programming a Digital Processor with a Single Connection," by Joseph Alan Thomsen; and is hereby incorporated by reference herein for all purposes.

TECHNICAL FIELD

The present disclosure relates generally to programming of digital processors with embedded program memory, e.g., a microprocessor, a microcontroller, a digital signal processor (DSP), a programmable logic array (PLA), an application specific integrated circuit (ASIC) and the like, and, more particularly, to programming the digital processor through a single signal connection on an integrated circuit package containing the digital processor.

BACKGROUND

Integrated circuit digital processors, e.g., microprocessors, microcontrollers, digital signal processors (DSP), programmable logic array (PLA), application specific integrated circuit (ASIC) and the like, are becoming smaller and with fewer input-output (I/O) signal connections (e.g., pins) for both cost and space considerations. Typically, three or four connections may be used in programming the digital processor, e.g., JTAG uses four connections with at least one dedicated full time. One connection may be driven to a voltage above a normal operating voltage of that connection to signify that the digital processor should be in a programming mode. The other two connections may be used for data and a synchronous clock. By using one pin at a higher voltage during programming, other functions (non-programming) may also be associated with the programming pins, unless in system programming is desired.

SUMMARY

As smaller and smaller geometry integrated circuit fabrication processes are used to produce integrated circuit digital processors, these newer processes produce circuit elements that may not be able to withstand a high voltage without damage when used to signify a programming mode. What is needed is a way to program integrated circuit digital processors without requiring a high voltage for indicating a programming mode, and to further reduce the number of connections needed during the programming mode.

According to a specific example embodiment of this disclosure, a digital processor may comprise: a central processing unit; a program memory coupled to the central processing unit; an instruction encoder/decoder coupled to the central processing unit and the program memory; a serial decoder coupled to the instruction encoder/decoder; a serial encoder coupled to the instruction encoder/decoder; a single bit bus receiver coupled to the serial decoder; a single bit bus transmitter coupled to the serial encoder; and a single bit programming connection coupled to the single bit bus receiver and transmitter; wherein data is transferred into the program memory through the single bit programming connection by sending programming instructions to the instruction encoder/decoder.

According to another specific example embodiment of this disclosure, a method for programming a digital processor through a single bit connection may comprise the steps of: providing an instruction encoder/decoder coupled to a central processing unit and a program memory; providing a single bit serial decoder coupled to the instruction encoder/decoder; providing a single bit serial encoder coupled to the instruction encoder/decoder; providing a single bit bus receiver coupled to the single bit serial decoder and to a single bit programming connection; providing a single bit bus transmitter coupled to the single bit serial encoder and to the single bit programming connection; and transferring data into the program memory through the single bit programming connection by sending programming instructions to the processor instruction encoder/decoder.

BRIEF DESCRIPTION OF THE DRAWINGS

A more complete understanding of the present disclosure thereof may be acquired by referring to the following description taken in conjunction with the accompanying drawing, wherein.

Figure 1:
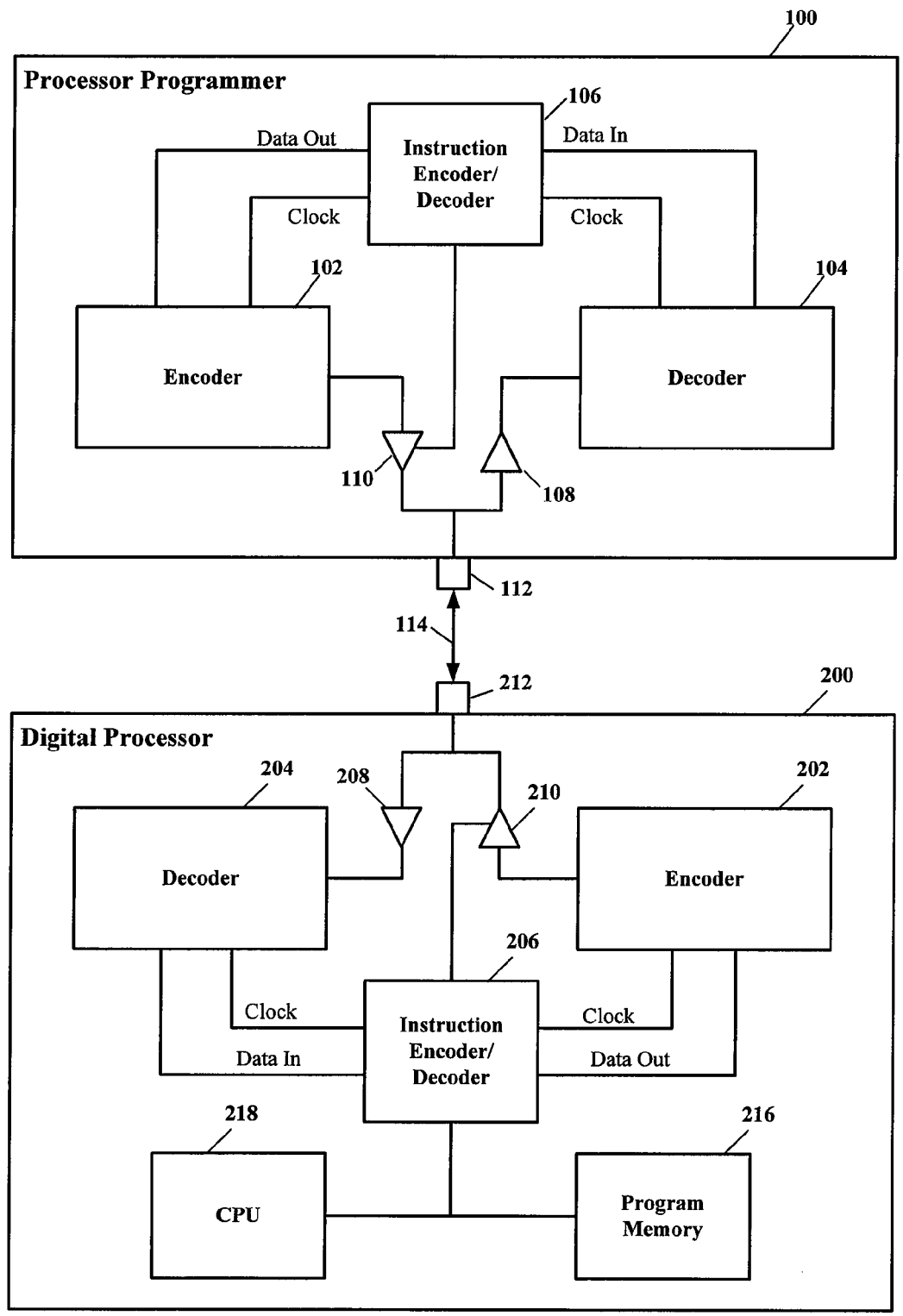
FIG. 1 illustrates a schematic block diagram of an integrated circuit digital processor and a processor programmer coupled together for programming of the digital processor, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an integrated circuit digital processor and a processor programmer coupled together for programming of the digital processor, according to a specific example embodiment of the present disclosure. A digital processor 202 may be coupled to a processor programmer 100 through a single conductor programming bus 114. The digital processor 202 and the processor programmer 100, each have a single programming connection (e.g., terminal, pin, etc.) 212 and 112, respectively, coupled to the single conductor programming bus 114.

The processor programmer 100 may comprise an instruction encoder/decoder 106, a encoder 102, a decoder 104, a bus receiver 108 and a bus transmitter 110. The bus receiver 108 and bus transmitter 110 may be coupled to the single connection 112 that may be coupled to the single conductor programming bus 114. The instruction encoder/decoder 106 may be coupled to a programming console (not shown) e.g., a personal computer, workstation, etc.

The digital processor 200 may comprise an instruction encoder/decoder 206, an encoder 202, a decoder 204, a bus receiver 208, a bus transmitter 210, a central processing unit (CPU) 218, and a program memory 216. The bus receiver 208 and bus transmitter 210 may be coupled to the single connection 212, e.g., connection, terminal, pin, ball, etc., on an integrated circuit package (not shown) containing the digital processor 200. The single connection 212 may be coupled to the single conductor programming bus 114. The instruction encoder/decoder 106 may be coupled to the CPU 218 and the program memory 216. The program memory 216 may be, for example but not limited to, electrically programmable read only memory (EPROM), electrically erasable and programmable read only memory (EEPROM), and FLASH memory. The encoders 102 and 202, and decoders 104 and 204 may use any serial protocol where a signal comprises both clock and data information, e.g., Manchester encoding.

Manchester encoding is a digital serial data encoding technique having a synchronous clock. A Manchester encoded data stream may be used to encode clock and data of a synchronous bit stream onto a single-wire (bit) bus. In Manchester encoding, the actual binary data to be transmitted over the single-wire bus is not sent as a sequence of logic 1's and 0's (technically known as Non Return to Zero (NRZ)). Instead in Manchester encoding the bits are translated into changes in logic levels. As examples, a logic 0 may be an upward transition at a bit center, e.g., logic 0 to logic 1 transition, and a logic 1 may be an downward transition at a bit center, e.g., logic 1 to logic 0 transition. The opposite logic level transitions may also be used to represent logic 1s and 0s in Manchester encoding.

A Manchester encoded signal contains a plurality of frequent level transitions that may allow the data receiver to extract a clock signal frequency from the transmitting device. For reliable clock frequency extraction, the transmitted bit stream should contain a high density of bit transitions. Manchester encoding has a high density of bit transitions that allows reliable extraction of the transmitting device clock frequency.

A programming mode for the digital processor 200 may be entered by the processor programmer 100 providing a string of logic 1s on the programming connection 212 of the digital processor 200 for a certain length of time. The digital processor 200 may then recognize that a programming mode is to be entered due to the string of logic 1s being received at the programming connection 212. The digital processor 200 may remain in the programming mode until a data stream, e.g., alternating logic 1s and 0s, on the single conductor programming bus 114 is no longer active for a certain period of time. A start header of the data stream comprising a string of logic 1s may also allow synchronization of an internal programming clock of the digital processor 200 with the programming clock of the processor programmer 100, e.g., Manchester encoding.

A command may be initiated with the transmission of a start bit (e.g., logic 0) followed by, for example, a programming command. At the end of the programming command a stop bit (e.g., logic 1) may be issued. If the programming command has data to be written to the program memory 216, the programming command may transmit a start bit, the data to be written in the program memory 216 and a stop bit. If the command requests data to be read, the processor programmer 100 may quit driving the single conductor programming bus 114, e.g., by putting the bus transmitter 110 output into a high impedance condition (tri-state). Then the digital processor 200 may drive the single conductor programming bus 114 with a start bit, the requested data and a stop bit. After the stop bit, the digital processor 200 may quit driving the single conductor programming bus 114, e.g., by putting the bus transmitter 210 output into a high impedance condition (tri-state). Then the processor programmer 100 may resume control of the programming commands. The processor programmer 100 may continue to drive encoded logic 1s on the single conductor programming bus 114 until another programming command is ready to be sent by the processor programmer 100. When all programming has been completed, e.g., program instructions, data and pointer values, etc., the encoded string of logic 1s from the processor programmer 100 may cease and after a certain time the digital processor 200 may recognize the lack of a string of logic 1s on the programming connection 212 indicates an exit from the programming mode and back to normal operation. Similarly, other command sequences may be used for any test modes that may be desired to be incorporated in the digital processor. Thus only one connection (e.g., connection 212) may be required for a wide range of programming and testing of the digital processor 200.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for programming a digital processor through a single bit connection, said method comprising the steps of:

sending for a predetermined time period a serial bit stream having a unique data pattern to indicate entry into a programming mode from a programmer to a digital processor through a single bit bus, wherein the digital processor enters into the programming mode after the predetermined time period and due to recognition of the unique data pattern indicating entry into the programming mode;

sending the serial bit stream having program instructions from the programmer to the digital processor through the single bit bus;

sending the serial bit stream having data from the programmer to the digital processor through the single bit bus; and receiving the serial bit stream having the program instructions and the data by the digital processor from the single bit bus, wherein the digital processor stores the program instructions and the data in a memory of the digital processor;

wherein the steps of sending the serial bit stream having the program instructions and the data from the programmer to the digital processor through the single bit bus comprise the steps of:

encoding the program instructions and the data from the programmer into the serial bit stream;

sending the serial bit stream having the program instructions and the data to a single bit bus driver in the programmer, wherein the single bit bus driver is coupled to the single bit bus;

wherein the steps of receiving the serial bit stream having the program instructions and the data by the digital processor from the single bit bus comprise the steps of:

receiving the serial bit stream having the program instructions and the data with a single bit bus receiver in the digital processor, wherein the single bit bus receiver is coupled to the single bit bus;

decoding the program instructions and the data from the serial bit bus receiver; and storing the decoded program instructions and the data into a program memory in the digital processor.

2. The method according to claim 1, wherein the serial bit stream is a Manchester-encoded protocol serial bit stream.

3. The method according to claim 2, wherein a serial clock is synchronized with the serial bit stream at the single bit programming connection.

4. The method according to claim 2, further comprising the step of reading the program memory through the single bit programming connection.

5. The method according to claim 2, further comprising the step of entering a test mode through the single bit programming connection.

* * * * *